(12) United States Patent
Matsumoto et al.

(10) Patent No.: US 9,273,182 B2
(45) Date of Patent: Mar. 1, 2016

(54) METHOD FOR PRODUCING POLYESTER COMPOSITIONS

(75) Inventors: Mayumi Matsumoto, Mishima (JP); Hiroji Kojima, Mishima (JP); Jun Sakamoto, Otsu (JP)

(73) Assignee: Toray Industries, Inc. (JP)

( * ) Notice: Subject to any disclaimer, the term of this patent is extended or adjusted under 35 U.S.C. 154(b) by 279 days.

(21) Appl. No.: 13/821,142

(22) PCT Filed: Jul. 29, 2011

(86) PCT No.: PCT/JP2011/067436
§ 371 (c)(1),
(2), (4) Date: Apr. 1, 2013

(87) PCT Pub. No.: WO2012/032876
PCT Pub. Date: Mar. 15, 2012

(65) Prior Publication Data
US 2013/0253165 A1    Sep. 26, 2013

(30) Foreign Application Priority Data

Sep. 8, 2010 (JP) ................................ 2010-200524

(51) Int. Cl.
| | |
|---|---|
| *C08G 63/78* | (2006.01) |
| *C08K 5/00* | (2006.01) |
| *C08L 67/02* | (2006.01) |
| *C08G 63/20* | (2006.01) |
| *C08G 63/80* | (2006.01) |
| *C08K 3/00* | (2006.01) |

(52) U.S. Cl.
CPC ................ *C08G 63/78* (2013.01); *C08G 63/20* (2013.01); *C08G 63/80* (2013.01); *C08K 5/0066* (2013.01); *C08L 67/02* (2013.01); *C08K 3/0058* (2013.01)

(58) Field of Classification Search
CPC ...... C08L 67/02; C08G 63/83; C08J 2367/02; C08K 5/0066; C08K 3/0058
See application file for complete search history.

(56) References Cited

FOREIGN PATENT DOCUMENTS

| JP | 8-059810 A | 3/1996 |
|---|---|---|
| JP | 80-59810 | * 3/1996 |
| JP | 2001-114881 A | 4/2001 |
| JP | 2002-047340 A | 2/2002 |
| JP | 2007-277548 | * 10/2007 |
| JP | 2007-277548 A | 10/2007 |
| JP | 2008-007750 A | 1/2008 |

OTHER PUBLICATIONS

Written Opinion of the International Searching Authority for PCT/JP2011/067436 mailed on Nov. 8, 2011.*
Yuki, Kazuo, *Howa Polyester Jushi Handbook*, The Nikkan Kogyo Shinbun, Ltd., Dec. 22, 1989, pp. 154-166 (partial English translation 18 pages).

* cited by examiner

*Primary Examiner* — Gregory Listvoyb
(74) *Attorney, Agent, or Firm* — DLA Piper LLP (US)

(57) ABSTRACT

A process of producing a polyester composition includes carrying out an esterification reaction of a dicarboxylic acid component with a diol component, and then carrying out a polycondensation reaction, wherein the diol component is added twice or more during a time from completion of the esterification reaction until beginning the polycondensation reaction, and alkali metal phosphate is added with an amount of COOH terminal groups of an esterification reactant being not more than 150 eq/ton.

12 Claims, No Drawings

METHOD FOR PRODUCING POLYESTER COMPOSITIONS

RELATED APPLICATIONS

This application is a §371 of International Application No. PCT/JP2011/067436, with an international filing date of Jul. 29, 2011 (WO 2012/032876 A1, published Mar. 15, 2012), which is based on Japanese Patent Application No. 2010-200524, filed Sep. 8, 2010, the subject matter of which is incorporated herein by reference.

TECHNICAL FIELD

This disclosure relates to a process of producing a polyester composition with good hydrolysis resistance.

BACKGROUND

Polyester has excellent mechanical properties, thermal properties, chemical resistance, electrical properties, and formability and has been used in various applications.

However, because polyester decreases its mechanical properties due to hydrolysis when used over a long period of time or used in humid situations, various studies to suppress hydrolysis have been carried out. Particularly in films for a solar battery, the outdoor lifetime of 20 years or more is required and, therefore high hydrolysis resistance is required.

JP 2001-114881 A describes a process for producing polyester containing phosphate of an alkali metal or an alkaline earth metal. Further, JP 2007-277548 A describes a process for producing polyester containing inorganic phosphate, and phosphoric acid is used in combination in Examples. JP 2008-007750 A describes polyethylene terephthalate containing a buffer phosphorus compound, and a phosphorus compound is used in combination in Examples.

Only by a metal phosphate, as in the process of producing polyester disclosed in JP '881, initial COOH terminal groups can be suppressed. However, it is difficult to suppress an increase in the amount of COOH terminal groups due to hydrolysis, and sufficient hydrolysis resistance cannot be obtained in applications that require long-term durability such as solar battery application.

In the case of the process of producing polyester disclosed in JP '548, because the ratio of phosphoric acid to inorganic phosphate and their amount were inappropriate, inorganic phosphate readily turned into a foreign body and, although the short-term hydrolysis resistance was excellent, the hydrolysis resistance over a long period of time required in solar battery applications and the like was insufficient, and mechanical properties of a film was reduced by the foreign bodies.

In the case of polyethylene terephthalate disclosed in JP '750, appropriateness of the type, ratio, amount and the like of the phosphorus compound is insufficient and, therefore, hydrolysis resistance and mechanical properties are insufficient for solar battery applications.

Examples of the process of producing polyester include the method in which polycondensation is carried out after esterification reaction using dicarboxylic acid as a main raw material (direct polymerization method) and the method in which polycondensation is carried out after transesterification reaction using dicarboxylic acid ester as a main raw material (DMT method). The DMT method disperses particle components well and is excellent in suppression of foreign bodies, but has a problem in that the raw material cost is high compared to the direct polymerization method. On the other hand, the direct polymerization method allows an esterification reaction without a catalyst and further is very cost-effective because the raw material is inexpensive, but has a problem in that the hydrolysis resistance decreases because the amount of COOH terminal groups in the resulting polyester is high compared to the case of the DMT method.

Thus, there is a need to provide a process of producing a polyester composition suitable for use in a film with excellent hydrolysis resistance.

SUMMARY

We thus provide a process of producing a polyester composition comprising: carrying out an esterification reaction of dicarboxylic acid component with diol component; and then carrying out a polycondensation reaction, wherein the diol component is added twice or more during the time from completion of the esterification reaction until the start of the polycondensation reaction, and then alkali metal phosphate is added with the amount of COOH terminal groups of an esterification reactant being not more than 150 eq/ton.

According to our process, the amount of COOH terminal groups of a polyester composition can be controlled and, at the same time, a polyester composition with excellent hydrolysis resistance can be provided.

DETAILED DESCRIPTION

Our process will now be described in detail.

In our process of producing a polyester composition, it is necessary that, in the process of producing polyester comprising carrying out an esterification reaction of dicarboxylic acid component with diol component, and carrying out a polycondensation reaction, the diol component be added twice or more during the time from completion of the esterification reaction until the start of the polycondensation reaction, and alkali metal phosphate be added with the amount of COOH terminal groups of an esterification reactant being not more than 150 eq/ton.

As the dicarboxylic acid component, various dicarboxylic acid components such as aromatic dicarboxylic acids, chain aliphatic dicarboxylic acids, and alicyclic dicarboxylic acids can be used. Among them, aromatic dicarboxylic acids are preferred from the standpoint of mechanical properties, heat resistance, and wet heat resistance of the polyester composition. In particular, terephthalic acid, isophthalic acid, and naphthalene dicarboxylic acid are preferred in view of polymerizability and mechanical properties.

Various diols can be used as the diol component. Examples thereof include aliphatic diols such as ethylene glycol, 1,2-propanediol, 1,3-propanediol, butanediol, 2-methyl-1,3-propanediol, hexanediol, and neopentyl glycol; alicyclic diols including saturated alicyclic primary diols such as cyclohexanedimethanol, cyclohexanediethanol, decahydronaphthalenedimethanol, decahydronaphthalenediethanol, norbornanedimethanol, norbornanediethanol, tricyclodecanedimethanol, tricyclodecane diethanol, tetracyclododecanedimethanol, tetracyclododecane-diethanol, decalin dimethanol, and decalin diethanol, saturated heterocyclic primary diols containing a cyclic ether, such as 2,6-dihydroxy-9-oxabicyclo[3,3,1]nonane, 3,9-bis(2-hydroxy-1,1-dimethylethyl)-2,4,8,10-tetraoxaspiro[5,5]undecane(spiroglycol), 5-methylol-5-ethyl-2-(1,1-dimethyl-2-hydroxyethyl)-1,3-dioxane, and isosorbide, and further various alicyclic diols such as cyclohexanediol, bicyclohexyl-4,4'-diol, 2,2-bis(4-hydroxycyclohexyl propane), 2,2-bis(4-(2-hydroxyethoxy)cyclohexyl)propane, cyclopentanediol, 3-methyl-1,2-cyclopentadiol, 4-cyclopentene-1,3-diol, and adamantanediol; and aromatic cyclic diols such as bisphenol A, bisphenol S, styrene glycol, 9,9-bis(4-(2-hydroxyethoxy)phenyl)fluorene, and 9,9'-bis(4-hydroxyphenyl)fluorene. In addition to the diols, polyfunctional alcohols such as trimethylolpropane and pentaerythritol can also be used.

Among them, diols having a boiling point of 230° C. or lower are preferred because of the ease of distillation out of the reaction system, and aliphatic diols are more preferred because of low cost and high reactivity. Further, ethylene glycol is particularly preferred from the standpoint of mechanical properties.

Generally, when an esterification reaction is carried out using dicarboxylic acid component and diol component as a material, the method in which an esterification reactant is pooled in advance, and a slurry of dicarboxylic acid and diol is added thereto to initiate the esterification reaction is selected to improve handleability of dicarboxylic acid insoluble in the diol and reduce the reaction time. The esterification reaction proceeds without pooling an esterification reactant, but pressurizing equipment or a catalyst can be necessary. Also, it is desirable to carry out an esterification reaction using a pooled esterification reactant.

In our process of producing a polyester composition, when an esterification reactant is obtained from the dicarboxylic acid component and the diol component described above, the molar ratio of the diol component to the dicarboxylic acid component before the start of esterification reaction (diol component/dicarboxylic acid component) is preferably 1.05 to 1.40 from the standpoint of esterification reactivity and heat resistance. When the molar ratio is in this preferred range, the time cycle can be shortened because the esterification reaction proceeds efficiently and the heat resistance is maintained because of reduced by-product formation of dimers of the diol component. The ratio is more preferably 1.05 to 1.30, and still more preferably 1.05 to 1.20.

Further, in the esterification reaction, an alkali metallic salt, titanium compound, ammonium salt and the like may be used as a catalyst, but the esterification reaction is preferably carried out without a catalyst because pyrolysis, generation of foreign bodies and the like at the polycondensation reaction stage can be problematic. The esterification reaction proceeds sufficiently even without a catalyst by autocatalysis of COOH terminal groups.

It is necessary to add the diol component twice or more to the esterification reactant after the esterification reaction. By adding the diol component to the esterification reactant, the amount of COOH terminal groups of the esterification reactant is controlled, the amount of COOH terminal groups of the polyester composition after polycondensation reaction is reduced and hydrolysis resistance is improved. In addition, by adding alkali metal phosphate before the polycondensation reaction, the increase in COOH terminal groups is suppressed and high hydrolysis resistance is provided.

Addition of the diol component needs to be carried out during the time from completion of the esterification reaction until the start of the polycondensation reaction. If addition of the diol component is carried out during the polycondensation reaction, the effect of reducing the amount of COOH terminal groups of the polyester composition finally obtained will be reduced because the diol component does not react efficiently with COOH terminal groups of the esterification reactant. It is preferable to add the diol component during the time from when the esterification reaction rate reaches 90% or more until the intrinsic viscosity reaches 0.3 in the esterification reaction using the dicarboxylic acid component and the diol component. When the addition of diol is carried out under these preferred conditions, by-product formation of diol component dimers is suppressed and heat resistance can be maintained. In addition, the amount of COOH terminal groups is less likely to increase because unreacted terephthalic acid is less likely to remain and hydrolysis resistance is maintained.

Further, the diol component needs to be added twice or more. By adding the diol component portionwise, the amount of COOH terminal groups of an esterification reactant can be reduced efficiently to minimize the time cycle extended by the addition. Further, by minimizing extension of the time cycle, the content of dimers of the diol component can be 1.3% by weight or less based on the resulting polyester composition. If the diol component is added to the esterification reactant in one portion, there are concerns about stirring problems due to solidification of the esterification reactant and delay of time cycle because the temperature in the reaction system decreases sharply. Although there is no upper limit on the number of additions, the number of additions is preferably not more than ten times and more preferably not more than five times. When the number is not more than such a preferred number of additions, the production efficiency will not be reduced and the effect of reducing the amount of COOH terminal groups can be maintained.

When the diol component is added, the lower limit of the temperature in the reaction system is preferably not less than 210° C. and, further, adding while maintaining not less than 220° C. is preferred. The upper limit of the temperature in the reaction system is preferably not more than 260° C. and more preferably not more than 250° C. Further, the second and subsequent addition of the diol component is preferably carried out after the temperature in the reaction system returns to 230° C. or higher and more preferably 235° C. or higher. By maintaining the temperature in the system at 210 to 260° C., the addition can be repeated efficiently and the amount of COOH terminal groups of the esterification reactant can be rapidly reduced. Further, stirring problems due to solidification of the esterification reactant and delay of time cycle can be prevented.

Further, the amount of the diol component added after the esterification reaction is preferably 0.15-fold to 0.5-fold mole compared to the amount of the total dicarboxylic acid component per addition in view of production efficiency and heat resistance and more preferably 0.15-fold to 0.3-fold mole. When the amount per addition is in this range, the COOH terminal groups of the esterification reactant can be reduced effectively without impairing the heat resistance and a polyester composition with good hydrolysis resistance can be obtained. In addition, the amount may be varied from addition to addition.

The lower limit of the total amount of the diol component added is preferably 0.3-fold mole or greater, more preferably 0.4-fold mole or greater, and still more preferably 0.5-fold mole or greater compared to the amount of the total dicarboxylic acid component. The upper limit is preferably up to 1.5-fold mole, more preferably up to 1.0-fold mole, and still more preferably up to 0.9-fold mole. When the total amount of the diol component added is in the range described above, COOH terminal groups of the esterification reactant and the diol component can be reacted sufficiently. Consequently, the amount of COOH terminal groups of the resulting polyester composition can be efficiently reduced and a polyester composition having good hydrolysis resistance with maintained heat resistance can be obtained.

Further, it is preferable to distill the COOH terminal groups of the esterification reactant and the unreacted diol component out of the reaction system after the diol component is added in view of shorter time cycle, suppressed by-product formation of dimers of the diol component, and heat resistance. By distilling off the unreacted diol component out of the reaction system, the temperature rapidly returns. Consequently, the content of dimers of the diol component can be 1.3% by weight or less based on the resulting polyester composition.

When the diol component is added, it is preferable to add a metal compound having an esterification reaction activity simultaneously with the diol component. As a metal compound, metallic salts are preferred and specific examples thereof include metal chlorides, metal acetates, metal carbonates and the like, among which metal acetates such as sodium acetate, calcium acetate, magnesium acetate, manganese acetate, cobalt acetate, zinc acetate, and tin acetate are preferred. Further, in view of reactivity of COOH terminal groups of the esterification reactant with the diol component and hydrolysis resistance, calcium acetate, magnesium acetate, and manganese acetate are preferred. To reduce the amount of COOH terminal groups efficiently, the lower limit of the addition amount is preferably 1.0 mol/ton or more and more preferably 2.0 mol/ton or more in terms of the concentration in the resulting polyester composition. The upper limit of the addition amount is preferably 3.5 mol/ton or less in view of hydrolysis resistance and more preferred is 3.0 mol/ton or less. Further, when the diol component is added more than once, it is preferable to simultaneously add the whole amount of the metallic salt at the first addition. By adding the metallic salt together with the diol component, reactivity of COOH terminals of the esterification reactant with the diol component is improved and the COOH terminals can be reduced efficiently, whereby a polyester composition with good hydrolysis resistance can be obtained.

After the addition of the diol component, it is necessary to add alkali metal phosphate during the time until the start of the polycondensation reaction. When alkali metal phosphate is added, it is necessary that, after the esterification reaction, the diol component is added and then the alkali metal phosphate is added to a reaction system having an esterification reactant with the amount of COOH terminal groups of not more than 150 eq/ton, more preferably not more than 100 eq/ton, and still more preferably not more than 50 eq/ton. By adding alkali metal phosphate when the amount of COOH terminal groups of an esterification reactant is 150 eq/ton or less, the amount of COOH terminal groups of the resulting polyester composition can be 20 eq/ton or less, and a polyester composition having high hydrolysis resistance can be obtained. If the amount of COOH terminal groups of an esterification reactant when adding alkali metal phosphate is more than 150 eq/ton, the amount of COOH terminal groups of the resulting polyester composition will be large and sufficient hydrolysis resistance cannot be obtained. The smaller the amount of COOH terminal groups of an esterification reactant, the better the hydrolysis resistance, but the criterion of the lower limit is preferably 10 eq/ton. If the amount of COOH terminal groups is not less than 10 eq/ton, it is not necessary to add a large amount of diol component over a long period of time and reduced heat resistance due to by-product formation of dimers of the diol component can be prevented. The diol component may be further added after alkali metal phosphate was added.

Examples of the alkali metal phosphate include sodium dihydrogenphosphate, disodium hydrogenphosphate, trisodium phosphate, potassium dihydrogenphosphate, dipotassium hydrogenphosphate, tripotassium phosphate, lithium dihydrogenphosphate, dilithium hydrogenphosphate, and trilithium phosphate, but are not limited thereto. Among them, sodium dihydrogenphosphate and potassium dihydrogenphosphate are preferred in view of hydrolysis resistance.

The lower limit of the addition amount of alkali metal phosphate, in view of hydrolysis resistance, is preferably 0.1 mol/ton or more and more preferably 0.4 mol/ton or more in terms of the concentration in the resulting polyester composition. The upper limit of the addition amount, in view of suppression of foreign bodies and hydrolysis resistance, is preferably 7.0 mol/ton or less, more preferably 4.0 mol/ton or less, and still more preferably 2.0 mol/ton or less. By adding alkali metal phosphate in this range, a polyester composition with good hydrolysis resistance can be obtained.

As a method of adding alkali metal phosphate, adding after mixing with the diol component and a phosphorus compound in advance is preferred in view of hydrolysis resistance. At this time, the phosphorus compound is preferably mixed in an amount of 0.1-fold mole to 7.5-fold mole, more preferably 0.3-fold mole to 5.0-fold mole, and still more preferably 1.0-fold mole to 2.0-fold mole compared to the amount of the alkali metal phosphate. By mixing the phosphorus compound in an amount of 0.1-fold mole to 7.5-fold mole compared to the amount of the alkali metal phosphate, the reaction activity in hydrolysis of the resulting polyester composition can be controlled, and a polyester composition with good hydrolysis resistance can be obtained.

The lower limit of the addition amount of the phosphorus compound mixed with alkali metal phosphate, in view of hydrolysis resistance and heat resistance, is preferably 0.1 mol/ton or more and more preferably 1.0 mol/ton or more in terms of the concentration in the resulting polyester composition. The upper limit of the addition amount is preferably 4.0 mol/ton or less and more preferably 2.5 mol/ton or less in view of hydrolysis resistance. By mixing the phosphorus compound with alkali metal phosphate in the range described above, hydrolysis resistance can be improved without impairing production efficiency.

Further, as a method of adding alkali metal phosphate, adding after forming a solution or slurry in advance is preferred in view of suppression of foreign bodies. As a solvent, a diol compound such as ethylene glycol is used, and it is preferable to prepare at a concentration of 0.5% by weight to 10% by weight and more preferably 1% by weight to 3% by weight. By adding as a solution of the concentration described above, a polyester composition with good hydrolysis resistance can be obtained without impairing heat resistance. Examples of the phosphorus compound mixed with alkali metal phosphate include phosphoric acid, trimethyl phosphate, trimethyl phosphonoacetate, dimethyl phenylphosphonate, and the like, but are not limited thereto. Among them, phosphoric acid is preferred from the standpoint of hydrolysis resistance.

The polymerization catalyst used in the process is not particularly limited and various catalysts can be used. For example, complex oxides of aluminum and silica as well as antimony compounds such as antimony trioxide, germanium compounds such as germanium dioxide, and titanium compounds such as titanium alkoxide can be used.

It is preferable to add a tri- or more functional copolymer component during the time until the start of a polycondensation reaction. Examples of tri- or more functional copolymer components include, for example, polycarboxylic acids such as trimellitic acid, cyclohexanetricarboxylic acid, biphenyltetracarboxylic acid, pyromellitic acid, butanetetracarboxylic acid, and trimer acids obtained by trimerizing long-chain aliphatic carboxylic acid, and anhydrides and esters thereof; polyhydric alcohols such as glycerin, pentaerythritol, dipentaerythritol, trimethylolpropane, ditrimethylolpropane, trihydroxybenzene carboxylic acid, and trihydroxyhexane; polyhydroxycarboxylic acids such as citric acid, dihydroxybenzene carboxylic acid, and dihydroxynaphthalene carboxylic acid, and anhydrides and esters thereof; and the like. In particular, a trifunctional copolymer component is preferred in view of film formability.

For the time of adding a tri- or more functional copolymer component, it is preferable to add during the time until the start of the polycondensation reaction, specifically, before the intrinsic viscosity reaches 0.3. A polyester oligomer with an intrinsic viscosity of less than 0.3, because of its low viscosity, is able to allow the tri- or more functional copolymer component to react uniformly. Further, from the standpoint of effectively preventing a local reaction from proceeding to cause large foreign bodies, the interval until the addition of other additives is preferably 5 minutes or more.

The lower limit of the addition amount of the tri- or more functional copolymer component, in view of the hydrolysis resistance after film formation, is preferably 0.01 mol % or more and more preferably 0.05 mol % or more based on the whole acid components obtained. The upper limit of the addition amount is preferably 1.00 mol % or less and more preferably 0.50 mol % or less in view of gelation control. When the addition amount of the tri- or more functional copolymer component is in the preferred range described above, a sufficient hydrolysis resistance effect is provided, and progression of gelation is prevented, whereby good formability can be maintained.

As a method of adding the tri- or more functional copolymer component, in view of reactivity and suppression of foreign bodies, adding as an ethylene glycol solution of 0.5% by mass to 5% by mass is preferred. By adding as an ethylene glycol solution in the range described above, the tri- or more functional copolymer component and the polyester oligomer can be allowed to react uniformly. When the concentration of the tri- or more functional copolymer component in the ethylene glycol solution is in the preferred range described above, the amount of ethylene glycol added into the system is not too large. Therefore, the amount of diethylene glycol, a by-product, will not increase, whereby the heat resistance and hydrolysis resistance are maintained. At the same time, a local reaction is less likely to occur and large foreign bodies are less likely to be generated.

Our process of producing a polyester composition will now be described by way of a specific example.

First, to an esterification reactor charged with bishydroxyethyl terephthalate dissolved at 255° C., slurry of terephthalic acid and ethylene glycol (1.15-fold mole compared to the amount of terephthalic acid) is gradually added using a snake pump to promote an esterification reaction. The temperature in the reaction system is controlled to be 245 to 255° C., and the esterification reaction is considered to be complete when the reaction rate reached 95%.

To the esterification reactant at 255° C. thus obtained, ethylene glycol and manganese acetate in an amount of 0.27-fold mole compared to the amount of terephthalic acid are simultaneously added. At this time, it is preferable to set the temperature in the system at 210 to 260° C. so that the esterification reactant will not be solidified. Unreacted ethylene glycol is distilled off, and when the temperature in the system returns to 235° C., the second addition is carried out using ethylene glycol in an amount of 0.27-fold mole compared to the amount of terephthalic acid. Ethylene glycol is distilled off, and when the temperature returns to 235° C. again, the third addition is carried out using ethylene glycol in an amount of 0.27-fold mole; ethylene glycol in an amount of 0.81-fold mole in total is added in three portions. Depending on the addition amount, the amount per addition and the number of addition can be varied.

After the total amount is added, a sodium dihydrogenphosphate/phosphoric acid/ethylene glycol mixed solution is added when the temperature in the system returns to 235° C.

Thereafter, while increasing the temperature in a polymerization apparatus gradually to 280° C., the pressure in the polymerization apparatus is gradually reduced from normal pressure to 133 Pa or less to distill off ethylene glycol. At this time, if the amount of COOH terminal groups of the polyester composition is desired to be lower, it is preferable to set the polymerization temperature low. The reaction is terminated when a predetermined stirring torque is reached, and the reaction system is brought to normal pressure with nitrogen. The resultant is discharged in strands into cold water and cut to obtain a polyester composition in the form of a pellet.

EXAMPLES

Our processes will now be described specifically by way of examples.

The measurements of physical properties were performed according to the following method.
(1) Intrinsic Viscosity (IV)

The measurement was made at 25° C. using o-chlorophenol as a solvent.
(2) The Amount of COOH Terminal Groups The measurement was made according to the Maurice's method described in the literature below:
M. J. Maurice, F. Huizing a "Anal. Chim. Acta" Vol. 22, p-363 (1960).
(3) Evaluation of Hydrolysis Resistance ($\Delta$COOH)

A polyester composition in the form of a pellet was heat treated at 155° C. and 100% RH for 4 hours, and the difference in the amount of COOH terminal groups before and after the treatment (the amount of COOH terminal groups after treatment—the amount of COOH terminal groups before treatment) was compared. When the difference in the amount of COOH terminal groups at this time ($\Delta$COOH) was 50 eq/ton or less, the polyester composition was judged to have good hydrolysis resistance.

As a treatment apparatus, a heat treatment apparatus PRESSER COOKER 306SIII (manufactured by HIRAYAMA MANUFACTURING CORP.) was used.
(4) DEG (Diethylene Glycol) Content in Polyester Composition A polyester composition was dissolved in monoethanolamine as a solvent, and a 1,6-hexanediol/methanol mixed solution was added to the solution. The resulting mixture was cooled and neutralized with terephthalic acid, and then centrifuged, after which a supernatant fluid was measured using gas chromatography (GC-14A, available from Shimadzu Corporation).

Example 1

While maintaining the temperature in the reaction system in which an esterification reactor was charged in advance with 105 parts by weight of bishydroxyethyl terephthalate (equivalent to 100 parts by weight of polyethylene terephthalate (hereinafter referred to as PET)) at 245 to 255° C., a slurry comprising 86 parts by weight of terephthalic acid and 37 parts by weight of ethylene glycol was fed into the reaction system with a snake pump, and esterification reaction was allowed to proceed to distill water. When the esterification reaction rate reached 95%, the esterification reaction was terminated to obtain an esterification reactant with the amount of COOH terminal groups of 334 eq/ton. The obtained esterification reactant in an amount of 105 parts by weight (equivalent to 100 parts by weight of PET) was loaded into a polymerization apparatus equipped with a distillation apparatus, and 0.06 parts by weight (equivalent to 2.4 mol/ton) of manganese acetate, 0.03 parts by weight (equivalent to 1.0 mol/ton) of antimony trioxide, and 8.7 parts by weight (0.27-fold mole compared to the amount of terephthalic acid in 100 parts by weight of PET) of ethylene glycol were simultaneously added to distill off unreacted ethylene glycol. When the temperature in the system returned to 235° C., 8.7 parts by weight of ethylene glycol was added again, after which the temperature was returned to 235° C. again while distilling off the unreacted ethylene glycol, and, further, the third addition was carried out using 8.7 parts by weight of ethylene glycol; 26.1 parts by weight in total (0.81-fold mole compared to the amount of terephthalic acid in 100 parts by weight of PET) of ethylene glycol was added. After completion of the addition, when the reaction system temperature returned to 235° C. while distilling off the unreacted ethylene glycol and the amount of COOH terminal groups decreased to 48 eq/ton, a solution of 0.027 parts by weight (equivalent to 1.7 mol/ton) of sodium dihydrogenphosphate dihydrate/0.02 parts by weight (equivalent to 2.0 mol/ton, 1.2-fold mole compared to the amount of alkali metal phosphate) of phosphoric acid/1.6 parts by weight of ethylene glycol was added. The ethylene glycol distilled off was 5.5 parts by weight in total.

Thereafter, while increasing the temperature in the polymerization apparatus from 235° C. to 280° C. over 90 minutes, the pressure in the polymerization apparatus was gradually reduced from normal pressure to 133 Pa or less to distill off ethylene glycol. The reaction was terminated when the melt viscosity equivalent to the intrinsic viscosity of 0.65 was reached, and the reaction system was brought to normal pressure with nitrogen gas and a molten polymer was discharged in strands from the lower part of the polymerization apparatus into cold water. The polyester strand discharged and solidified was cut to obtain a polyester composition in the form of a pellet. The properties of the polyester composition obtained are shown in Table 1. This polyester composition had good hydrolysis resistance.

Examples 2 to 9, Comparative Examples 1 to 3

A polyester composition was obtained in the same manner as in Example 1 except that the amount of the ethylene glycol added and the number of additions were changed.

The polyester composition obtained in Examples 2 to 7 also had sufficient hydrolysis resistance.

The polyester composition obtained in Examples 8 and 9 had good hydrolysis resistance similar to that in Example 1.

In Comparative Example 1, the addition of ethylene glycol was not performed and the amount of COOH terminal groups when adding alkali metal phosphate was over the upper limit. Therefore, the amount of COOH terminal groups of the polyester composition was large and sufficient hydrolysis resistance could not be obtained.

In Comparative Example 2, the amount of COOH terminal groups after the addition of ethylene glycol was over the upper limit. Therefore, the amount of COOH terminal groups of the polyester composition was large and sufficient hydrolysis resistance could not be obtained.

In Comparative Example 3, because of the addition of ethylene glycol in one portion, it took time for the temperature in the system to return. Further, effective reaction with COOH terminal groups could not be achieved. Therefore, the amount of COOH terminal groups of the polyester composition and the DEG content were large and sufficient hydrolysis resistance could not be obtained.

The results of these Examples and Comparative Examples are shown in Tables 1 and 2.

Example 10

A polyester composition was obtained in the same manner as in Example 1 except that when ethylene glycol was added and the unreacted ethylene glycol was not distilled off, but refluxed. This polyester composition had sufficient hydrolysis resistance. The results are shown in Table 3.

Example 11

While maintaining the temperature in the reaction system in which an esterification reactor was charged in advance with 105 parts by weight of bishydroxyethyl terephthalate (equivalent to 100 parts by weight of PET) at 245 to 255° C., a slurry comprising 86 parts by weight of terephthalic acid and 37 parts by weight of ethylene glycol was fed into the reaction system with a snake pump, and esterification reaction was allowed to proceed to distill water. When the esterification reaction rate reached 95%, the esterification reaction was terminated to obtain an esterification reactant with the amount of COOH terminal groups of 334 eq/ton. The obtained esterification reactant in an amount of 105 parts by weight (equivalent to 100 parts by weight of PET) was loaded into a polymerization apparatus equipped with a distillation apparatus, and 8.7 parts by weight (0.27-fold mole compared to the amount of terephthalic acid in 100 parts by weight of PET) of ethylene glycol was added to distill off unreacted ethylene glycol. When the temperature in the system returned to 235° C., 8.7 parts by weight of ethylene glycol was added again, after which the temperature was returned to 235° C. again while distilling off the unreacted ethylene glycol, and, further, the third addition was carried out using 8.7 parts by weight of ethylene glycol; 26 parts by weight in total (0.8-fold mole compared to the amount of terephthalic acid in 100 parts by weight of PET) of ethylene glycol was added. After completion of the addition, when the amount of COOH terminal groups decreased to 88 eq/ton, 0.06 parts by weight of manganese acetate and 0.03 parts by weight of antimony trioxide were added, and, after 5 minutes, a solution of 0.027 parts by weight (equivalent to 1.7 mol/ton) of sodium dihydrogenphosphate dihydrate/0.02 parts by weight (equivalent to 2.0 mol/ton) of phosphoric acid/1.6 parts by weight of ethylene glycol was added. The ethylene glycol distilled off was 15.1 parts by weight in total.

Thereafter, while increasing the temperature in the polymerization apparatus from 235° C. to 280° C. over 90 minutes, pressure in the polymerization apparatus was gradually reduced from normal pressure to 133 Pa or less to distill off ethylene glycol. The reaction was terminated when the melt viscosity equivalent to the intrinsic viscosity of 0.65 was reached and the reaction system was brought to normal pressure with nitrogen gas and a molten polymer was discharged in strands from the lower part of the polymerization apparatus into cold water. The polyester strand discharged and cooled was cut to obtain a polyester composition in the form of a pellet. This polyester composition had sufficient hydrolysis resistance. The results are shown in Table 3.

Example 12

While maintaining the temperature in the reaction system in which an esterification reactor was charged in advance with 105 parts by weight of bishydroxyethyl terephthalate (equivalent to 100 parts by weight of PET) at 245 to 255° C., a slurry comprising 86 parts by weight of terephthalic acid and 37 parts by weight of ethylene glycol was fed into the reaction system with a snake pump, and esterification reaction was allowed to proceed to distill water. When the esterification reaction rate reached 95%, the esterification reaction was terminated to obtain an esterification reactant with the amount of COOH terminal groups of 334 eq/ton. The obtained esterification reactant in an amount of 105 parts by weight (equivalent to 100 parts by weight of PET) was loaded into a polymerization apparatus equipped with a distillation apparatus, and 0.06 parts by weight (equivalent to 2.4 mol/ton) of manganese acetate, 0.03 parts by weight (equivalent to 1.0 mol/ton) of antimony trioxide, and 8.7 parts by weight (0.27-fold mole compared to the amount of terephthalic acid in 100 parts by weight of PET) of ethylene glycol were simultaneously added to distill off unreacted ethylene glycol. When the temperature in the system returned to 225° C., 8.7 parts by weight of ethylene glycol was added again, after which the temperature was returned to 225° C. again while distilling off the unreacted ethylene glycol and, further, the third addition was carried out using 8.7 parts by weight of ethylene glycol; 26.1 parts by weight in total (0.81-fold mole compared to the amount of terephthalic acid in 100 parts by weight of PET) of ethylene glycol was added. After completion of the addition, when the reaction system temperature returned to 235° C. while distilling off the unreacted ethylene glycol and the amount of COOH terminal groups decreased to 125 eq/ton, a solution of 0.027 parts by weight (equivalent to 1.7 mol/ton) of sodium dihydrogenphosphate dihydrate/0.02 parts by weight (equivalent to 2.0 mol/ton, 1.2-fold mole compared to the amount of alkali metal phosphate) of phosphoric acid/1.6 parts by weight of ethylene glycol was added. The ethylene glycol distilled off was 8.5 parts by weight in total.

Thereafter, while increasing the temperature in the polymerization apparatus from 235° C. to 280° C. over 90 minutes, the pressure in the polymerization apparatus was gradually reduced from normal pressure to 133 Pa or less to distill off ethylene glycol. The reaction was terminated when the melt viscosity equivalent to the intrinsic viscosity of 0.65 was reached and the reaction system was brought to normal pressure with nitrogen gas and a molten polymer was discharged in strands from the lower part of the polymerization apparatus into cold water. The polyester strand discharged and solidified was cut to obtain a polyester composition in the form of a pellet. This polyester composition had sufficient hydrolysis resistance. The results are shown in Table 3.

Examples 13 to 20

A polyester composition was obtained in the same manner as in Example 1 except that the amount of a metallic salt simultaneously added when ethylene glycol was added and the type of metallic salt were changed.

The polyester composition obtained in Examples 13 to 15 had such sufficient hydrolysis resistance that will not cause any problem when used in a solar battery or the like.

The polyester composition obtained in Examples 16 to 20 also had sufficient hydrolysis resistance.

The results of these Examples are shown in Table 4.

Examples 21 to 28

A polyester composition was obtained in the same manner as in Example 1 except that the amount of alkali metal phosphate added after addition and the type of alkali metal phosphate were changed.

The polyester composition obtained in Examples 21 to 25, 27, and 28 had good hydrolysis resistance similar to that in Example 1.

The polyester composition obtained in Example 26 had sufficient hydrolysis resistance.

The results of these Examples are shown in Table 5.

Examples 29 to 37

A polyester composition was obtained in the same manner as in Example 1 except that the type of phosphorus compound mixed with alkali metal phosphate, the addition amount of the phosphorus compound and the molar ratio of the mixed phosphorus compound (to alkali metal phosphate) were changed.

The polyester composition obtained in Examples 29 and 30 had hydrolysis resistance at such a level that no problem occurs when used in solar battery application or the like.

The polyester composition obtained in Examples 31 to 33 had good hydrolysis resistance similar to that of Example 1.

The polyester composition obtained in Example 34 had hydrolysis resistance at such a level that no problem occurs when used in solar battery application or the like.

The polyester composition obtained in Examples 35 to 37 had sufficient hydrolysis resistance.

The results of these Examples are shown in Tables 6 and 7.

Example 38

While maintaining the temperature in the reaction system in which an esterification reactor was charged in advance with 105 parts by weight of bishydroxyethyl terephthalate (equivalent to 100 parts by weight of PET) at 245 to 255° C., a slurry comprising 86 parts by weight of terephthalic acid and 37 parts by weight of ethylene glycol was supplied with a snake pump and esterification reaction was allowed to proceed to distill water. When the esterification reaction rate reached 95%, the esterification reaction was terminated to obtain an esterification reactant with the amount of COOH terminal groups of 334 eq/ton. The obtained esterification reactant in an amount of 105 parts by weight (equivalent to 100 parts by weight of PET) was loaded into a polymerization apparatus equipped with a distillation apparatus, and 0.06 parts by weight (equivalent to 2.4 mol/ton) of manganese acetate, 0.03 parts by weight (equivalent to 1.0 mol/ton) of antimony trioxide, and 8.7 parts by weight (0.27-fold mole compared to the amount of terephthalic acid in 100 parts by weight of PET) of ethylene glycol were simultaneously added to distill off unreacted ethylene glycol. When the temperature in the system returned to 235° C., 8.7 parts by weight of ethylene glycol was added again, after which the temperature was returned to 235° C. again while distilling off the unreacted ethylene glycol, and, further, the third addition was carried out using 8.7 parts by weight of ethylene glycol; 26 parts by weight in total (0.8-fold mole compared to the amount of terephthalic acid in 100 parts by weight of PET) of ethylene glycol was added. After completion of the addition, when the reaction system temperature returned to 235° C. while distilling off the unreacted ethylene glycol and the amount of COOH terminal groups decreased to 48 eq/ton, a solution of 0.027 parts by weight (equivalent to 1.7 mol/ton) of sodium dihydrogenphosphate dihydrate/1.4 parts by weight of ethylene glycol and 0.02 parts by weight (equivalent to 2.0 mol/ton) of phosphoric acid/0.2 parts by weight of ethylene glycol was added without mixing. The ethylene glycol distilled off was 5.5 parts by weight in total.

Thereafter, while increasing the temperature in the polymerization apparatus from 235° C. to 280° C. over 90 minutes, the pressure in the polymerization apparatus was gradually reduced from normal pressure to 133 Pa or less to distill off ethylene glycol. The reaction was terminated when the melt viscosity equivalent to the intrinsic viscosity of 0.65 was reached, and the reaction system was brought to normal pressure with nitrogen gas and a molten polymer was discharged in strands from the lower part of the polymerization apparatus into cold water. The polyester strand discharged and solidified was cut to obtain a polyester composition in the form of a pellet.

This polyester composition had hydrolysis resistance at such a level that no problem occurs when used in solar battery applications or the like. The results are shown in Table 7.

Comparative Example 4

A polyester composition was obtained in the same manner as in Example 1 except that a metallic salt and alkali metal phosphate were not added.

Because a metallic salt was not added simultaneously in the addition, effective reaction with COOH terminal groups could not be achieved and the amount of COOH terminal groups of the polyester composition and the DEG content tended to increase compared to Example 1. Further, because alkali metal phosphate was not added, the polyester composition of Comparative Example 4 did not provide sufficient hydrolysis resistance. The results are shown in Table 7.

Example 39

While maintaining the temperature in the reaction system in which an esterification reactor was charged in advance with 105 parts by weight of bishydroxyethyl terephthalate (equivalent to 100 parts by weight of PET) at 245 to 255° C., a slurry comprising 86 parts by weight of terephthalic acid and 37 parts by weight of ethylene glycol was fed into the reaction system with a snake pump and esterification reaction was allowed to proceed to distill water. When the esterification reaction rate reached 95%, the esterification reaction was terminated to obtain an esterification reactant with the amount of COOH terminal groups of 334 eq/ton. The obtained esterification reactant in an amount of 105 parts by weight (equivalent to 100 parts by weight of PET) was loaded into a polymerization apparatus equipped with a distillation apparatus, and 0.06 parts by weight (equivalent to 2.4 mol/ton) of manganese acetate, 0.03 parts by weight (equivalent to 1.0 mol/ton) of antimony trioxide, and 8.7 parts by weight (0.27-fold mole compared to the amount of terephthalic acid in 100 parts by weight of PET) of ethylene glycol were simultaneously added to distill off unreacted ethylene glycol. When the temperature in the system returned to 235° C., 8.7 parts by weight of ethylene glycol was added again, after which the temperature was returned to 235° C. again while distilling off the unreacted ethylene glycol and, further, the third addition was carried out using 8.7 parts by weight of ethylene glycol; 26.1 parts by weight in total (0.81-fold mole compared to the amount of terephthalic acid in 100 parts by weight of PET) of ethylene glycol was added. After completion of the addition, when the reaction system temperature returned to 235° C. while distilling off the unreacted ethylene glycol, 0.01 parts by weight of trimellitic anhydride (1% by weight of ethylene glycol solution) was added as a copolymer component (the amount of COOH terminal groups after the addition was 45 eq/ton). After 5 minutes, a solution of 0.027 parts by weight (equivalent to 1.7 mol/ton) of sodium dihydrogenphosphate dihydrate/0.02 parts by weight (equivalent to 2.0 mol/ton, 1.2-fold mole compared to the amount of alkali metal phosphate) of phosphoric acid/1.6 parts by weight of ethylene glycol was added. The ethylene glycol distilled off was 5.5 parts by weight in total.

Thereafter, while increasing the temperature in the polymerization apparatus from 235° C. to 280° C. over 90 minutes, the pressure in the polymerization apparatus was gradually reduced from normal pressure to 133 Pa or less to distill off ethylene glycol. The reaction was terminated when the melt viscosity equivalent to the intrinsic viscosity of 0.65 was reached, and the reaction system was brought to normal pressure with nitrogen gas and a molten polymer was discharged in strands from the lower part of the polymerization apparatus into cold water. The polyester strand discharged and solidified was cut to obtain a polyester composition in the form of a pellet. Similarly to Example 1, a polyester composition with good hydrolysis resistance was obtained. The properties of the polyester composition obtained are shown in Table 8.

Examples 40 to 44

A polyester composition was obtained in the same manner as in Example 39 except that the amount of the trimellitic anhydride added as a copolymer component was changed.

In Examples 40 and 41, the addition amount of trimellitic anhydride was increased compared to Example 39, whereby the polyester composition had a reduced amount of COOH terminal groups and had good hydrolysis resistance.

The polyester compositions obtained in Examples 42 and 43 had sufficient hydrolysis resistance and were at such a level that no problem occurs when used in solar battery applications or the like.

The polyester composition obtained in Example 44 had sufficient hydrolysis resistance.

The results of these Examples are shown in Table 8.

Example 45

While maintaining the temperature in the reaction system in which an esterification reactor was charged in advance with 105 parts by weight of bishydroxyethyl terephthalate (equivalent to 100 parts by weight of PET) at 245 to 255° C., a slurry comprising 86 parts by weight of terephthalic acid, 0.2 parts by weight of trimellitic anhydride, and 37 parts by weight of ethylene glycol was fed into the reaction system with a snake pump, and esterification reaction was allowed to proceed to distill water. When the esterification reaction rate reached 95%, the esterification reaction was terminated to obtain an esterification reactant with the amount of COOH terminal groups of 335 eq/ton. The obtained esterification reactant in an amount of 105 parts by weight (equivalent to 100 parts by weight of PET) was loaded into a polymerization apparatus equipped with a distillation apparatus, and 8.7 parts by weight (0.27-fold mole compared to the amount of terephthalic acid in 100 parts by weight of PET) of ethylene glycol was added to distill off unreacted ethylene glycol. When the temperature in the system returned to 235° C., 8.7 parts by weight of ethylene glycol was added again, after which the temperature was returned to 235° C. again while distilling off the unreacted ethylene glycol and, further, the third addition was carried out using 8.7 parts by weight of ethylene glycol; 26 parts by weight in total (0.8-fold mole compared to the amount of terephthalic acid in 100 parts by weight of PET) of ethylene glycol was added. After completion of the addition, when the amount of COOH terminal groups decreased to 46 eq/ton, 0.06 parts by weight of manganese acetate and 0.03 parts by weight of antimony trioxide were added, and, after 5 minutes, a solution of 0.027 parts by weight (equivalent to 1.7 mol/ton) of sodium dihydrogen phosphatedihydrate/0.02 parts by weight (equivalent to 2.0 mol/ton) of phosphoric acid/1.6 parts by weight of ethylene glycol was added. The ethylene glycol distilled off was 15.1 parts by weight in total.

Thereafter, while increasing the temperature in the polymerization apparatus from 235° C. to 280° C. over 90 minutes, the pressure in the polymerization apparatus was gradually reduced from normal pressure to 133 Pa or less to distill off ethylene glycol. The reaction was terminated when the melt viscosity equivalent to the intrinsic viscosity of 0.65 was reached, and the reaction system was brought to normal pressure with nitrogen gas and a molten polymer was discharged in strands from the lower part of the polymerization apparatus into cold water. The polyester strand discharged and cooled was cut to obtain a polyester composition in the form of a pellet.

The polyester composition obtained in Example 45 had sufficient hydrolysis resistance. The results are shown in Table 8.

Example 46

While maintaining the temperature in the reaction system in which an esterification reactor was charged in advance with 105 parts by weight of bishydroxyethyl terephthalate (equivalent to 100 parts by weight of PET) at 245 to 255° C., a slurry comprising 86 parts by weight of terephthalic acid and 37 parts by weight of ethylene glycol was fed into the reaction system with a snake pump, and esterification reaction was allowed to proceed to distill water. When the esterification reaction rate reached 95%, the esterification reaction was terminated to obtain an esterification reactant with the amount of COOH terminal groups of 334 eq/ton. The obtained esterification reactant in an amount of 105 parts by weight (equivalent to 100 parts by weight of PET) was loaded into a polymerization apparatus equipped with a distillation apparatus, and 0.06 parts by weight (equivalent to 2.4 mol/ton) of manganese acetate, 0.03 parts by weight (equivalent to 1.0 mol/ton) of antimony trioxide, and 8.7 parts by weight (0.27-fold mole compared to the amount of terephthalic acid in 100 parts by weight of PET) of ethylene glycol were simultaneously added to distill off unreacted ethylene glycol. When the temperature in the system returned to 235° C., 8.7 parts by weight of ethylene glycol was added again, after which the temperature was returned to 235° C. again while distilling off the unreacted ethylene glycol and, further, the third addition was carried out using 8.7 parts by weight of ethylene glycol; 26.1 parts by weight in total (0.81-fold mole compared to the amount of terephthalic acid in 100 parts by weight of PET) of ethylene glycol was added. After completion of the addition, when the reaction system temperature returned to 235° C. while distilling off the unreacted ethylene glycol and the amount of COOH terminal groups decreased to 48 eq/ton, a solution of 0.027 parts by weight (equivalent to 1.7 mol/ton) of sodium dihydrogenphosphate dihydrate/0.02 parts by weight (equivalent to 2.0 mol/ton, 1.2-fold mole compared to the amount of alkali metal phosphate) of phosphoric acid/1.6 parts by weight of ethylene glycol was added. The ethylene glycol distilled off was 5.5 parts by weight in total.

Thereafter, while increasing the temperature in the polymerization apparatus from 235° C. to 280° C. over 90 minutes, the pressure in the polymerization apparatus was gradually reduced from normal pressure to 133 Pa or less to distill off ethylene glycol. The reaction system was brought to normal pressure with nitrogen when the intrinsic viscosity reached 0.50, and 0.1 parts by weight of trimellitic anhydride (1% by weight of ethylene glycol solution) was added as a copolymer component. Thereafter, the resultant was stirred for 5 minutes and the pressure was reduced to vacuum again to continue the polycondensation reaction. The reaction was terminated when the melt viscosity equivalent to the intrinsic viscosity of 0.65 was reached and the reaction system was brought to normal pressure with nitrogen gas and a molten polymer was discharged in strands from the lower part of the polymerization apparatus into cold water. The polyester strand discharged and solidified was cut to obtain a polyester composition in the form of a pellet. The properties of the polyester composition obtained are shown in Table 8.

The polyester composition obtained in Example 46 had such hydrolysis resistance that will not cause any problem when used in solar battery application or the like.

TABLE 1

|  |  | Example 1 | Example 2 | Example 3 | Example 4 | Example 5 | Example 6 | Example 7 |
|---|---|---|---|---|---|---|---|---|
| Diol addition | Addition times | 3 | 2 | 2 | 3 | 3 | 4 | 4 |
|  | 1st addition amount (fold mole) | 0.27 | 0.15 | 0.20 | 0.17 | 0.33 | 0.37 | 0.40 |
|  | 2nd addition amount (fold mole) | 0.27 | 0.15 | 0.20 | 0.17 | 0.33 | 0.37 | 0.40 |
|  | 3rd addition amount (fold mole) | 0.27 | — | — | 0.17 | 0.33 | 0.37 | 0.40 |
|  | 4th addition amount (fold mole) | — | — | — | — | — | 0.37 | 0.40 |
|  | Total addition amounts (fold mole) | 0.81 | 0.30 | 0.40 | 0.51 | 0.99 | 1.48 | 1.60 |
| Metalic salt | Metalic salt | Manganese acetate | Manganese acetate | Manganese acetate | Manganese acetate | Manganese acetate | Manganese acetate | Manganese acetate |
|  | Addition amounts (mol/ton) | 2.4 | 2.4 | 2.4 | 2.4 | 2.4 | 2.4 | 2.4 |
| Alkali metal phosphate | Alkali metal phosphate | Sodium dihydrogen-phosphate | Sodium dihydrogen-phosphate | Sodium dihydrogen-phosphate | Sodium dihydrogen-phosphate | Sodium dihydrogen-phosphate | Sodium dihydrogen-phosphate | Sodium dihydrogen-phosphate |
|  | Addition amounts (mol/ton) | 1.7 | 1.7 | 1.7 | 1.7 | 1.7 | 1.7 | 1.7 |
| Amount of COOH terminal groups when alkali metal phosphate is added (eq/ton) |  | 48 | 149 | 121 | 98 | 43 | 32 | 31 |

TABLE 1-continued

|  |  | Example 1 | Example 2 | Example 3 | Example 4 | Example 5 | Example 6 | Example 7 |
|---|---|---|---|---|---|---|---|---|
| Phosphorus compound | Phosphorus compound | phosphoric acid | phosphoric acid | phosphoric acid | phosphoric acid | phosphoric acid | phosphoric acid | phosphoric acid |
|  | Addition amounts (mol/ton) | 2.0 | 2.0 | 2.0 | 2.0 | 2.0 | 2.0 | 2.0 |
| Phosphorus compound mix ratio (compared to the amount of alkali metal phosphate) |  | 1.2 | 1.2 | 1.2 | 1.2 | 1.2 | 1.2 | 1.2 |
| Polymer properties | IV | 0.68 | 0.68 | 0.64 | 0.67 | 0.66 | 0.67 | 0.66 |
|  | Amount of COOH terminal groups | 11.5 | 15.2 | 14.4 | 12.9 | 11.5 | 11.2 | 14.2 |
|  | DEG (%) | 0.78 | 0.80 | 0.78 | 0.82 | 0.95 | 1.28 | 1.29 |
|  | ΔCOOH (eq/ton) | 32.0 | 48.7 | 40.4 | 32.8 | 34.6 | 40.5 | 44.3 |

TABLE 2

|  |  | Example 8 | Example 9 | Comparative Example 1 | Comparative Example 2 | Comparative Example 3 |
|---|---|---|---|---|---|---|
| Diol addition | Addition times | 3 | 3 | — | 2 | 1 |
|  | 1st addition amount (fold mole) | 0.20 | 0.34 | — | 0.05 | 0.81 |
|  | 2nd addition amount (fold mole) | 0.27 | 0.27 | — | 0.05 | — |
|  | 3rd addition amount (fold mole) | 0.34 | 0.20 | — | — | — |
|  | 4th addition amount (fold mole) | — | — | — | — | — |
|  | Total addition amounts (fold mole) | 0.81 | 0.81 | — | 0.10 | 0.81 |
| Metalic salt | Metalic salt | Manganese acetate | Manganese acetate | Manganese acetate | Manganese acetate | Manganese acetate |
|  | Addition amounts (mol/ton) | 2.4 | 2.4 | 2.4 | 2.4 | 2.4 |
| Alkali metal phosphate | Alkali metal phosphate | Sodium dihydrogen-phosphate | Sodium dihydrogenphosphate | Sodium dihydrogenphosphate | Sodium dihydrogenphosphate | Sodium dihydrogenphosphate |
|  | Addition amounts (mol/ton) | 1.7 | 1.7 | 1.7 | 1.7 | 1.7 |
|  | Amount of COOH terminal groups when alkali metal phosphate is added (eq/ton) | 47 | 49 | 334 | 231 | 51 |
| Phosphorus compound | Phosphorus compound | phosphoric acid | phosphoric acid | phosphoric acid | phosphoric acid | phosphoric acid |
|  | Addition amounts (mol/ton) | 2.0 | 2.0 | 2.0 | 2.0 | 2.0 |
| Phosphorus compound mix ratio (compared to the amount of alkali metal phosphate) |  | 1.2 | 1.2 | 1.2 | 1.2 | 1.2 |
| Polymer properties | IV | 0.67 | 0.88 | 0.88 | 0.64 | 0.67 |
|  | Amount of COOH terminal groups | 11.8 | 12.1 | 20.4 | 18.1 | 15.8 |
|  | DEG (%) | 0.79 | 0.79 | 0.82 | 0.79 | 1.95 |
|  | ΔCOOH (eq/ton) | 32.3 | 32.4 | 62.3 | 55.3 | 50.8 |

TABLE 3

|  |  | Example 10 | Example 11 | Example 12 |
|---|---|---|---|---|
| Diol addition | Addition times | 3 | 3 | 3 |
|  | 1st addition amount (fold mole) | 0.27 | 0.27 | 0.27 |
|  | 2nd addition amount (fold mole) | 0.27 | 0.27 | 0.27 |
|  | 3rd addition amount (fold mole) | 0.27 | 0.27 | 0.27 |
|  | 4th addition amount (fold mole) | — | — | — |
|  | Total addition amounts (fold mole) | 0.81 | 0.81 | 0.81 |

TABLE 3-continued

|  |  | Example 10 | Example 11 | Example 12 |
|---|---|---|---|---|
| Metalic salt | Metalic salt | Manganese acetate | Manganese acetate | Manganese acetate |
|  | Addition amounts (mol/ton) | 2.4 | 2.4 | 2.4 |
| Alkali metal phosphate | Alkali metal phosphate | Sodium dihydrogenphosphate | Sodium dihydrogenphosphate | Sodium dihydrogenphosphate |
|  | Addition amounts (mol/ton) | 1.7 | 1.7 | 1.7 |
| Amount of COOH terminal groups when alkali metal phosphate is added |  | 45 | 88 | 125 |
| Phosphorus compound | Phosphorus compound | phosphoric acid | phosphoric acid | phosphoric acid |
|  | Addition amounts (mol/ton) | 2.0 | 2.0 | 2.0 |
| Phosphorus compound mix ratio (compared to the amount of alkali metal phosphate) |  | 1.2 | 1.2 | 1.2 |
| Polymer properties | IV | 0.66 | 0.87 | 0.66 |
|  | Amount of COOH terminal groups | 10.1 | 17.5 | 15.2 |
|  | DEG (%) | 2.10 | 1.10 | 1.15 |
|  | ΔCOOH (eq/ton) | 49.4 | 49.7 | 48.7 |

TABLE 4

|  |  | Example 13 | Example 14 | Example 15 | Example 16 | Example 17 | Example 18 | Example 19 | Example 20 |
|---|---|---|---|---|---|---|---|---|---|
| Diol addition | Addition times | 3 | 3 | 3 | 3 | 3 | 3 | 3 | 3 |
|  | 1st addition amount (fold mole) | 0.27 | 0.27 | 0.27 | 0.27 | 0.27 | 0.27 | 0.27 | 0.27 |
|  | 2nd addition amount (fold mole) | 0.27 | 0.27 | 0.27 | 0.27 | 0.27 | 0.27 | 0.27 | 0.27 |
|  | 3rd addition amount (fold mole) | 0.27 | 0.27 | 0.27 | 0.27 | 0.27 | 0.27 | 0.27 | 0.27 |
|  | 4th addition amount (fold mole) | — | — | — | — | — | — | — | — |
|  | Total addition amounts (fold mole) | 0.81 | 0.81 | 0.81 | 0.81 | 0.81 | 0.81 | 0.81 | 0.81 |
| Metalic salt | Metalic salt | Manganese acetate | Manganese acetate | Manganese acetate | Manganese acetate | Manganese acetate | Manganese acetate | Magnesium acetate | Calcium acetyate |
|  | Addition amounts (mol/ton) | 0.5 | 1.0 | 2.0 | 3.0 | 3.5 | 4.0 | 2.4 | 2.4 |
| Alkali metal phosphate | Alkali metal phosphate | Sodium dihydrogen-phosphate | Sodium dihydrogen-phosphate | Sodium dihydrogen-phosphate | Sodium dihydrogen-phosphate | Sodium dihydrogen-phosphate | Sodium dihydrogen-phosphate | Sodium dihydrogen-phosphate | Sodium dihydrogen-phosphate |
|  | Addition amounts (mol/ton) | 1.7 | 1.7 | 1.7 | 1.7 | 1.7 | 1.7 | 1.7 | 1.7 |
| Amount of COOH terminal groups when alkali metal phosphate is added (eq/ton) |  | 77 | 62 | 55 | 46 | 45 | 44 | 55 | 49 |
| Phosphorus compound | Phosphorus compound | phosphoric acid | phosphoric acid | phosphoric acid | phosphoric acid | phosphoric acid | phosphoric acid | phosphoric acid | phosphoric acid |
|  | Addition amounts (mol/ton) | 2.0 | 2.0 | 2.0 | 2.0 | 2.0 | 2.0 | 2.0 | 2.0 |
| Phosphorus compound mix ratio (compared to the amount of alkali metal phosphate) |  | 1.2 | 1.2 | 1.2 | 1.2 | 1.2 | 1.2 | 1.2 | 1.2 |
| Polymer properties | IV | 0.68 | 0.67 | 0.67 | 0.66 | 0.64 | 0.66 | 0.67 | 0.65 |
|  | Amount of COOH terminal groups | 13.7 | 12.9 | 12.6 | 17.3 | 17.4 | 18.9 | 12.9 | 13.8 |
|  | DEG (%) | 0.83 | 0.80 | 0.79 | 0.81 | 0.88 | 0.92 | 0.92 | 0.84 |
|  | ΔCOOH (eq/ton) | 49.7 | 40.5 | 35.4 | 40.5 | 45.6 | 49.2 | 33.6 | 36.9 |

TABLE 5

|  |  | Example 21 | Example 22 | Example 23 | Example 24 |
|---|---|---|---|---|---|
| Diol addition | Addition times | 3 | 3 | 3 | 3 |
|  | 1st addition amount (fold mole) | 0.27 | 0.27 | 0.27 | 0.27 |
|  | 2nd addition amount (fold mole) | 0.27 | 0.27 | 0.27 | 0.27 |
|  | 3rd addition amount (fold mole) | 0.27 | 0.27 | 0.27 | 0.27 |
|  | 4th addition amount (fold mole) | — | — | — | — |
|  | Total addition amounts (fold mole) | 0.81 | 0.81 | 0.81 | 0.81 |
| Metalic salt | Metalic salt | Manganese acetate | Manganese acetate | Manganese acetate | Manganese acetate |
|  | Addition amounts (mol/ton) | 2.4 | 2.4 | 2.4 | 2.4 |
| Alkali metal phosphate | Alkali metal phosphate | Sodium dihydrogenphosphate | Sodium dihydrogenphosphate | Sodium dihydrogenphosphate | Sodium dihydrogenphosphate |
|  | Addition amounts (mol/ton) | 0.1 | 0.4 | 2.0 | 4.0 |
| Amount of COOH terminal groups when alkali metal phosphate is added (eq/ton) |  | 48 | 48 | 48 | 48 |
| Phosphorus compound | Phosphorus compound | phosphoric acid | phosphoric acid | phosphoric acid | phosphoric acid |
|  | Addition amounts (mol/ton) | 2.0 | 2.0 | 2.0 | 2.0 |
| Phosphorus compound mix ratio (compared to the amount of alkali metal phosphate) |  | 20.0 | 5.0 | 1.0 | 0.5 |
| Polymer properties | IV | 0.68 | 0.67 | 0.67 | 0.55 |
|  | Amount of COOH terminal groups | 11.5 | 11.2 | 11.2 | 11.3 |
|  | DEG (%) | 0.81 | 0.78 | 0.78 | 0.85 |
|  | ΔCOOH (eq/ton) | 33.5 | 32.1 | 32.0 | 35.3 |

|  |  | Example 25 | Example 26 | Example 27 | Example 28 |
|---|---|---|---|---|---|
| Diol addition | Addition times | 3 | 3 | 3 | 3 |
|  | 1st addition amount (fold mole) | 0.27 | 0.27 | 0.27 | 0.27 |
|  | 2nd addition amount (fold mole) | 0.27 | 0.27 | 0.27 | 0.27 |
|  | 3rd addition amount (fold mole) | 0.27 | 0.27 | 0.27 | 0.27 |
|  | 4th addition amount (fold mole) | — | — | — | — |
|  | Total addition amounts (fold mole) | 0.81 | 0.81 | 0.81 | 0.81 |
| Metalic salt | Metalic salt | Manganese acetate | Manganese acetate | Manganese acetate | Manganese acetate |
|  | Addition amounts (mol/ton) | 2.4 | 2.4 | 2.4 | 2.4 |
| Alkali metal phosphate | Alkali metal phosphate | Sodium dihydrogenphosphate | Sodium dihydrogenphosphate | Potassium dihydrogenphosphate | Disodium hydrogenphosphate |
|  | Addition amounts (mol/ton) | 7.6 | 8.3 | 1.7 | 1.7 |
| Amount of COOH terminal groups when alkali metal phosphate is added (eq/ton) |  | 48 | 48 | 48 | 48 |
| Phosphorus compound | Phosphorus compound | phosphoric acid | phosphoric acid | phosphoric acid | phosphoric acid |
|  | Addition amounts (mol/ton) | 2.0 | 2.0 | 2.0 | 2.0 |
| Phosphorus compound mix ratio (compared to the amount of alkali metal phosphate) |  | 0.3 | 0.2 | 1.2 | 1.2 |
| Polymer properties | IV | 0.88 | 0.64 | 0.86 | 0.55 |
|  | Amount of COOH terminal groups | 11.6 | 18.2 | 12.7 | 12.4 |
|  | DEG (%) | 0.95 | 0.98 | 0.80 | 0.79 |
|  | ΔCOOH (eq/ton) | 37.8 | 47.5 | 33.5 | 39.3 |

TABLE 6

|  |  | Example 29 | Example 30 | Example 31 | Example 32 | Example 33 | Example 34 |
|---|---|---|---|---|---|---|---|
| Diol addition | Addition times | 3 | 3 | 3 | 3 | 3 | 3 |
|  | 1st addition amount (fold mole) | 0.27 | 0.27 | 0.27 | 0.27 | 0.27 | 0.27 |
|  | 2nd addition amount (fold mole) | 0.27 | 0.27 | 0.27 | 0.27 | 0.27 | 0.27 |
|  | 3rd addition amount (fold mole) | 0.27 | 0.27 | 0.27 | 0.27 | 0.27 | 0.27 |
|  | 4th addition amount (fold mole) | — | — | — | — | — | — |
|  | Total addition amounts (fold mole) | 0.81 | 0.81 | 0.81 | 0.81 | 0.81 | 0.81 |
| Metalic salt | Metalic salt | Manganese acetate | Manganese acetate | Manganese acetate | Manganese acetate | Manganese acetate | Manganese acetate |
|  | Addition amounts (mol/ton) | 2.4 | 2.4 | 2.4 | 2.4 | 2.4 | 2.4 |
| Alkali metal phosphate | Alkali metal phosphate | Sodium dihydrogen-phosphate | Sodium dihydrogen-phosphate | Sodium dihydrogen-phosphate | Sodium dihydrogen-phosphate | Sodium dihydrogenphosphate | Sodium dihydrogenphosphate |
|  | Addition amounts (mol/ton) | 1.7 | 1.7 | 1.7 | 1.7 | 0.7 | 0.5 |
| Amount of COOH terminal groups when alkali metal phosphate is added (eq/ton) |  | 48 | 48 | 48 | 48 | 48 | 48 |
| Phosphorus compound | Phosphorus compound | phosphoric acid | phosphoric acid | phosphoric acid | phosphoric acid | phosphoric acid | phosphoric acid |
|  | Addition amounts (mol/ton) | 0.1 | 0.6 | 1.7 | 3.4 | 3.5 | 4.0 |
| Phosphorus compound mix ratio (compared to the amount of alkali metal phosphate) |  | 0.1 | 0.4 | 1.0 | 2.0 | 5.0 | 8.0 |
| Polymer properties | IV | 0.68 | 0.69 | 0.66 | 0.65 | 0.67 | 0.67 |
|  | Amount of COOH terminal groups | 16.2 | 14.6 | 12.4 | 12.8 | 13.5 | 16.1 |
|  | DEG (%) | 0.95 | 0.81 | 0.90 | 0.95 | 0.92 | 1.05 |
|  | ΔCOOH (eq/ton) | 48.3 | 48.0 | 34.4 | 32.9 | 39.7 | 49.6 |

TABLE 7

|  |  | Example 35 | Example 36 | Example 37 | Example 38 | Comparative Example 4 |
|---|---|---|---|---|---|---|
| Diol addition | Addition times | 3 | 3 | 3 | 3 | 3 |
|  | 1st addition amount (fold mole) | 0.27 | 0.27 | 0.27 | 0.27 | 0.27 |
|  | 2nd addition amount (fold mole) | 0.27 | 0.27 | 0.27 | 0.27 | 0.27 |
|  | 3rd addition amount (fold mole) | 0.27 | 0.27 | 0.27 | 0.27 | 0.27 |
|  | 4th addition amount (fold mole) | — | — | — | — | — |
|  | Total addition amounts (fold mole) | 0.81 | 0.81 | 0.81 | 0.81 | 0.81 |
| Metalic salt | Metalic salt | Manganeseacetate | Manganese acetate | Manganese acetate | Manganese acetate | — |
|  | Addition amounts (mol/ton) | 2.4 | 2.4 | 2.4 | 2.4 | — |
| Alkali metal phosphate | Alkali metal phosphate | Sodium dihydrogenphosphate | Sodium dihydrogenphosphate | Sodium dihydrogenphosphate | Sodium dihydrogenphosphate | — |
|  | Addition amounts (mol/ton) | 1.7 | 1.7 | 1.7 | 1.7 | — |
| Amount of COOH terminal groups when alkali metal phosphate is added (eq/ton) |  | 48 | 48 | 48 | 48 | 88 |
| Phosphorus compound | Phosphorus compound | TMPA | TEPA | DPPO | phosphoric acid | phosphoric acid |
|  | Addition amounts (mol/ton) | 2.0 | 2.0 | 2.0 | 2.0 | 2.0 |
| Phosphorus compound mix ratio (compared to the amount of alkali metal phosphate) |  | 1.2 | 1.2 | 1.2 | 1.2 | — |

TABLE 7-continued

|  |  | Example 35 | Example 36 | Example 37 | Example 38 | Comparative Example 4 |
|---|---|---|---|---|---|---|
| Polymer properties | IV | 0.65 | 0.66 | 0.68 | 0.67 | 0.65 |
|  | Amount of COOH terminal groups | 13.3 | 12.9 | 14.4 | 13.8 | 17.2 |
|  | DEG (%) | 0.82 | 0.86 | 0.85 | 0.88 | 1.32 |
|  | ΔCOOH (eq/ton) | 44.8 | 47.9 | 48.9 | 40.5 | 74.5 |

TMPA: Trimethyl phosphate
TEPA: Trimethyl phosphono acetate
DPPO: Dimethyl phenylphosphonate

TABLE 8

|  |  | Example 39 | Example 40 | Example 41 | Example 42 |
|---|---|---|---|---|---|
| Diol addition | Addition times | 3 | 3 | 3 | 3 |
|  | 1st addition amount (fold mole) | 0.27 | 0.27 | 0.27 | 0.27 |
|  | 2nd addition amount (fold mole) | 0.27 | 0.27 | 0.27 | 0.27 |
|  | 3rd addition amount (fold mole) | 0.27 | 0.27 | 0.27 | 0.27 |
|  | 4th addition amount (fold mole) | — | — | — | — |
|  | Total addition amounts (fold mole) | 0.81 | 0.81 | 0.81 | 0.81 |
| Metalic salt | Metalic salt | Manganese acetate | Manganese acetate | Manganese acetate | Manganese acetate |
|  | Addition amounts (mol/ton) | 2.4 | 2.4 | 2.4 | 2.4 |
| Alkali metal phosphate | Alkali metal phosphate | Sodium dihydrogenphosphate | Sodium dihydrogenphosphate | Sodium dihydrogenphosphate | Sodium dihydrogenphosphate |
|  | Addition amounts (mol/ton) | 1.7 | 1.7 | 1.7 | 1.7 |
| Amount of COOH terminal groups when alkali metal phosphate is added (eq/ton) |  | 45 | 43 | 42 | 41 |
| Phosphorus compound | Phosphorus compound | phosphoric acid | phosphoric acid | phosphoric acid | phosphoric acid |
|  | Addition amounts (mol/ton) | 2.0 | 2.0 | 2.0 | 2.0 |
| Phosphorus compound mix ratio (compared to the amount of alkali metal phosphate) |  | 1.2 | 1.2 | 1.2 | 1.2 |
| Tri- or more functional copolymer component | Multi-functional copolymer component | Trimellitic anhydride | Trimellitic anhydride | Trimellitic anhydride | Trimellitic anhydride |
|  | Addition amounts (mol/ton) | 0.01 | 0.03 | 0.10 | 0.50 |
| Polymer properties | IV | 0.67 | 0.67 | 0.66 | 0.67 |
|  | Amount of COOH terminal groups | 12.9 | 12.4 | 11.3 | 12.2 |
|  | DEG (%) | 0.81 | 0.84 | 0.85 | 0.92 |
|  | ΔCOOH (eq/ton) | 33.3 | 32.7 | 31.4 | 32.5 |

|  |  | Example 43 | Example 44 | Example 45 | Example 46 |
|---|---|---|---|---|---|
| Diol addition | Addition times | 3 | 3 | 3 | 3 |
|  | 1st addition amount (fold mole) | 0.27 | 0.27 | 0.27 | 0.27 |
|  | 2nd addition amount (fold mole) | 0.27 | 0.27 | 0.27 | 0.27 |
|  | 3rd addition amount (fold mole) | 0.27 | 0.27 | 0.27 | 0.27 |
|  | 4th addition amount (fold mole) | — | — | — | — |
|  | Total addition amounts (fold mole) | 0.81 | 0.81 | 0.81 | 0.81 |
| Metalic salt | Metalic salt | Manganese acetate | Manganese acetate | Manganese acetate | Manganese acetate |
|  | Addition amounts (mol/ton) | 2.4 | 2.4 | 2.4 | 2.4 |

TABLE 8-continued

| Alkali metal phosphate | Alkali metal phosphate | Sodium dihydrogenphosphate | Sodium dihydrogenphosphate | Sodium dihydrogenphosphate | Sodium dihydrogenphosphate |
|---|---|---|---|---|---|
| | Addition amounts (mol/ton) | 1.7 | 1.7 | 1.7 | 1.7 |
| | Amount of COOH terminal groups when alkali metal phosphate is added (eq/ton) | 38 | 38 | 46 | 48 |
| Phosphorus compound | Phosphorus compound | phosphoric acid | phosphoric acid | phosphoric acid | phosphoric acid |
| | Addition amounts (mol/ton) | 2.0 | 2.0 | 2.0 | 2.0 |
| | Phosphorus compound mix ratio (compared to the amount of alkali metal phosphate) | 1.2 | 1.2 | 1.2 | 1.2 |
| Tri- or more functional copolymer component | Multi-functional copolymer component | Trimellitic anhydride | Trimellitic anhydride | Trimellitic anhydride | Trimellitic anhydride |
| | Addition amounts (mol/ton) | 0.90 | 1.10 | 0.10 | 0.10 |
| Polymer properties | IV | 0.68 | 0.65 | 0.67 | 0.56 |
| | Amount of COOH terminal groups | 12.0 | 11.5 | 12.5 | 12.9 |
| | DEG (%) | 1.03 | 1.15 | 0.79 | 0.80 |
| | ΔCOOH (eq/ton) | 32.3 | 31.9 | 33.0 | 33.2 |

INDUSTRIAL APPLICABILITY

According to the production process of the present invention, the amount of COOH terminal groups can be controlled, and, at the same time, a polyester composition with good hydrolysis resistance can be provided, which allows suitable use in a film for a solar battery.

The invention claimed is:

1. A process of producing a polyester composition comprising:
carrying out an esterification reaction of a dicarboxylic acid component with a diol component; and then carrying out a polycondensation reaction,
wherein the diol component is added twice or more during a time from the completion of the esterification reaction until beginning the polycondensation reaction, and alkali metal phosphate is added with an amount of COOH terminal groups of an esterification reactant being not more than 150 eq/ton, wherein a dicarboxylic acid is one or more selected from the group consisting of terephthalic acid, isophthalic acid and naphthalene dicarboxylic acid, wherein a diol is one or more selected from the group consisting of ethylene glycol, 1,2-propanediol, 1,3-propanediol, butanediol, 2-methyl-1,3-propanediol, hexanediol and neopentyl glycol and wherein an alkali metal phosphate is one or more selected from the group consisting of sodium dihydrogenphosphate, disodium hydrogenphosphate, trisodium phosphate, potassium dihydrogenphosphate, dipotassium hydrogenphosphate, tripotassium phosphate, lithium dihydrogenphosphate, dilithium hydrogenphosphate and trilithium phosphate.

2. The process according to claim 1, wherein the amount of the diol component added is 0.15-fold to 0.5-fold mole compared to the amount of the dicarboxylic acid component per addition.

3. The process according to claim 1, wherein a metallic salt compound is added in an amount of 1.0 mol/ton to 3.5 mol/ton together with the diol component added.

4. The process according to claim 1, wherein the amount of the alkali metal phosphate added is 0.1 mol/ton to 7.0 mol/ton.

5. The process according claim 1, wherein the alkali metal phosphate is mixed with a phosphorus compound and the diol component and added as a solution or slurry.

6. The process according to claim 5, wherein the phosphorus compound is mixed in an amount of 0.1-fold to 7.5-fold mole compared to the amount of the alkali metal phosphate.

7. The process according to claim 2, wherein a metallic salt compound is added in an amount of 1.0 mol/ton to 3.5 mol/ton together with the diol component added.

8. The process according to claim 2, wherein the amount of the alkali metal phosphate added is 0.1 mol/ton to 7.0 mol/ton.

9. The process according to claim 3, wherein the amount of the alkali metal phosphate added is 0.1 mol/ton to 7.0 mol/ton.

10. The process according to claim 2, wherein the alkali metal phosphate is mixed with a phosphorus compound and the diol component and added as a solution or slurry.

11. The process according to claim 3, wherein the alkali metal phosphate is mixed with a phosphorus compound and the diol component and added as a solution or slurry.

12. The process according to claim 4, wherein the alkali metal phosphate is mixed with a phosphorus compound and the diol component and added as a solution or slurry.

* * * * *

UNITED STATES PATENT AND TRADEMARK OFFICE
CERTIFICATE OF CORRECTION

| | | |
|---|---|---|
| PATENT NO. | : 9,273,182 B2 | Page 1 of 1 |
| APPLICATION NO. | : 13/821142 | |
| DATED | : March 1, 2016 | |
| INVENTOR(S) | : Matsumoto et al. | |

It is certified that error appears in the above-identified patent and that said Letters Patent is hereby corrected as shown below:

Specification

In column 19

At Table 4, at Example 14, in row 23, please change "40.5" to --40.6--.

In column 20

At Table 4, at Example 20, in row 23, please change "36.9" to --38.9--.

In column 21

At Table 5, at Example 25, in row 12, please change "7.6" to --7.0--; and in row 17, please change "0.88" to --0.68--.

In column 22

At Table 5, at Example 24, in row 17, please change "0.55" to --0.66--; and at Example 28, in row 17, please change "0.55" to --0.65--.

In column 26

At Table 8, at Example 42, in row 22, please change "32.5" to --32.6--.

In column 28

At Table 8-continued, at Example 46, in row 10, please change "0.56" to --0.66--.

Signed and Sealed this
Twenty-sixth Day of July, 2016

Michelle K. Lee
*Director of the United States Patent and Trademark Office*